United States Patent [19]

Penza et al.

[11] Patent Number: 4,636,064
[45] Date of Patent: Jan. 13, 1987

[54] DEVICE FOR THE AUTOMATIC LOADING OF FILM MATERIAL ON A SUCTION PLATE

[75] Inventors: Hans Penza, Preetz; Siegfried Segler, Raisdorf; Karl-Wilhelm Schmuck, Kiel; Dietrich Asbach, Klausdorf; Eckhard Lindemann, Raisdorf, all of Fed. Rep. of Germany

[73] Assignee: Dr. Ing. Rudolf Hell GmbH, Fed. Rep. of Germany

[21] Appl. No.: 703,712

[22] Filed: Feb. 21, 1985

[30] Foreign Application Priority Data

Feb. 21, 1984 [DE] Fed. Rep. of Germany ....... 3406132
Nov. 10, 1984 [EP] European Pat. Off. ........ 84113607.0

[51] Int. Cl.$^4$ ............................................. G03B 27/60
[52] U.S. Cl. ......................................... 355/73; 355/91
[58] Field of Search ....................... 355/73, 91, 74, 47, 355/77

[56] References Cited

U.S. PATENT DOCUMENTS

| 1,750,294 | 3/1930 | Bassist | 355/91 |
| 2,574,392 | 11/1951 | Huebner | 355/73 |
| 3,617,127 | 11/1971 | McDuff | 355/73 |

Primary Examiner—L. T. Hix
Assistant Examiner—Della Rutledge
Attorney, Agent, or Firm—Hill, Van Santen, Steadman & Simpson

[57] ABSTRACT

A device for automatic loading of film material on a suction plate by transport roller pairs arranged at two oppositely disposed ends of the suction plate. One pair receives the film material and the other pair further transports the film material. At the two other lateral sides or ends of the suction plate, a roller is respectively provided extending over an entire side of the plate. A cloth can be wound on this roller such that the roller and cloth are so arranged that they respectively form a blind covering the suction plate up to and overlapping lateral edges of the film material.

12 Claims, 3 Drawing Figures 4,636,064

DEVICE FOR THE AUTOMATIC LOADING OF FILM MATERIAL ON A SUCTION PLATE

BACKGROUND OF THE INVENTION

In the case of exposure of film material in an exposure station, it is known from U.S. Pat. No. 3,617,127, incorporated herein by reference, that the film material is held in place by a planar suction plate. The film material is transported from a supply cassette in which it is wound up on a roller via the suction plate into a receiving or takeup cassette. There it is wound onto a takeup roller driven by a motor. The suction plate has several suction holes arranged in contiguous rectangles which are nested into one another. The suction holes are activated depending upon the employed film format However, this loading by a simple suction-contact is not sufficient for situations in which high precision is important, or also in which the suction plate is mechanically moved e.g. in a reversing fashion, since the film material is not held securely enough and creases can occur. Also, in order to hold the material securely, a considerable suction power is required without, on the whole, a very precise positioning of the material on the suction plate resulting. In addition, film material of a different width is to be loaded on the suction plate. This requires a pneumatic change-over of the suction holes of the suction plate.

SUMMARY OF THE INVENTION

Accordingly, an object of the present invention is to produce an apparatus for the automatic loading of film material on a suction plate with which, as compared with the simple suction-contacting of the film material through the suction plate, a precise positioning and a crease-free loading is guaranteed. This objective is achieved by providing first and second pairs of cooperating transport rollers at respective first and second opposite ends of the suction plate. Driving means are provided for driving the first and second pairs. The first pair is positioned to receive a leading edge of the film material and is driven to slide the film over the suction plate. The second pair is driven and positioned to receive and engage the leading side of the film material after it passes over the suction plate. The second roller pair is driven more rapidly than the first roller pair such that the film is tensioned between the two roller pairs. First and second shade rollers are provided at opposite lateral sides, and extends over the entire respective opposite lateral sides. About each roller a respective flexible sheet material is wound. Each flexible sheet material is dimensioned such that it forms a blind when unwound which together cover the suction plate. A leading end of each flexible material has a rail connected therewith which in the unwound state of the material abut each other approximately at a center line of the suction plate. Tension means are connected to each rail for drawing the rails toward each other. The shade rollers are connected to driving means which counteract the action of the tension means by pulling the cloths in a direction away from the center line.

DESCRIPTION OF THE PREFERRED EMBODIMENTS

Figure 1:
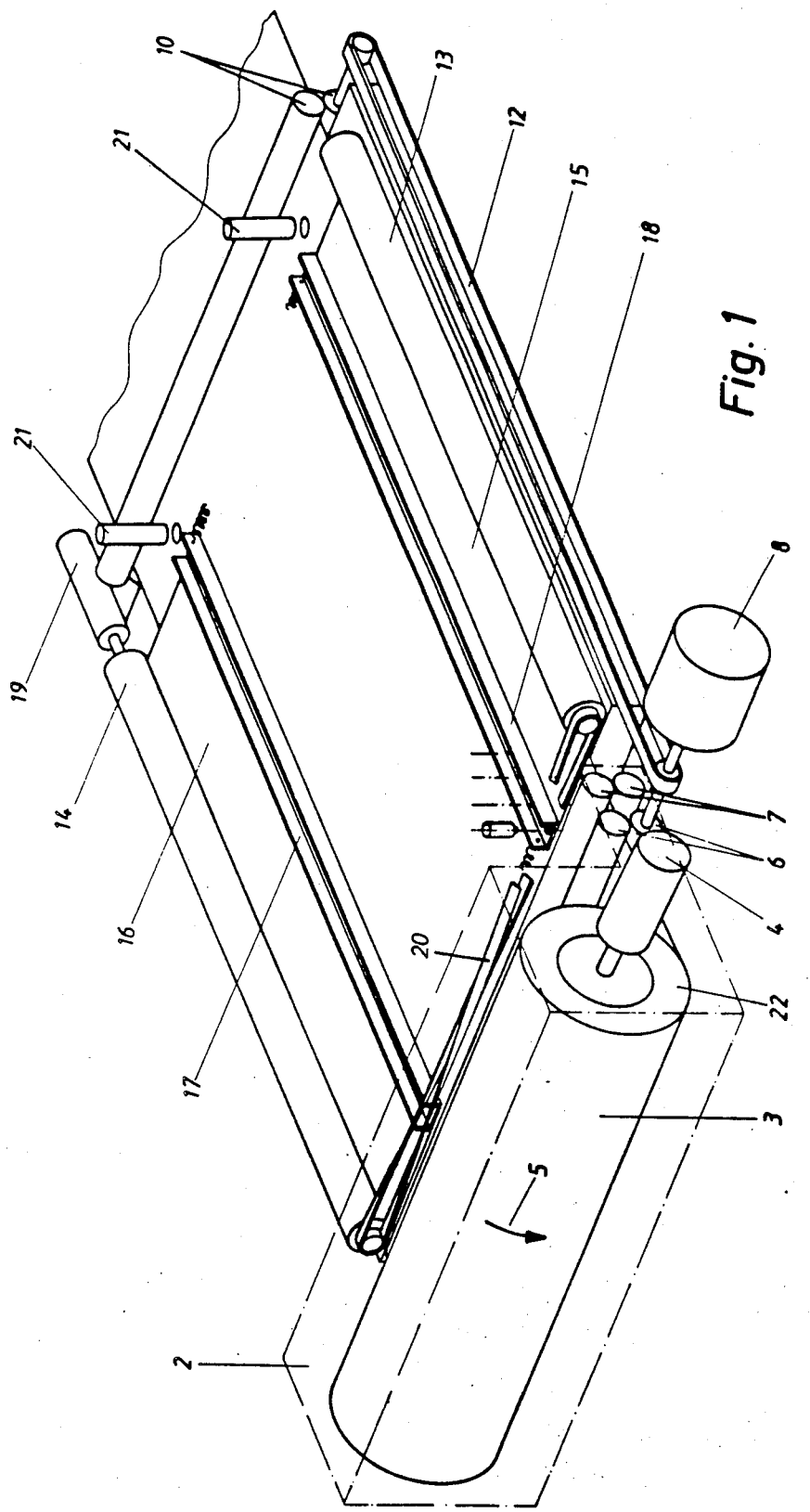
FIG. 1 shows a perspective view of the loading devices.
Figure 2:
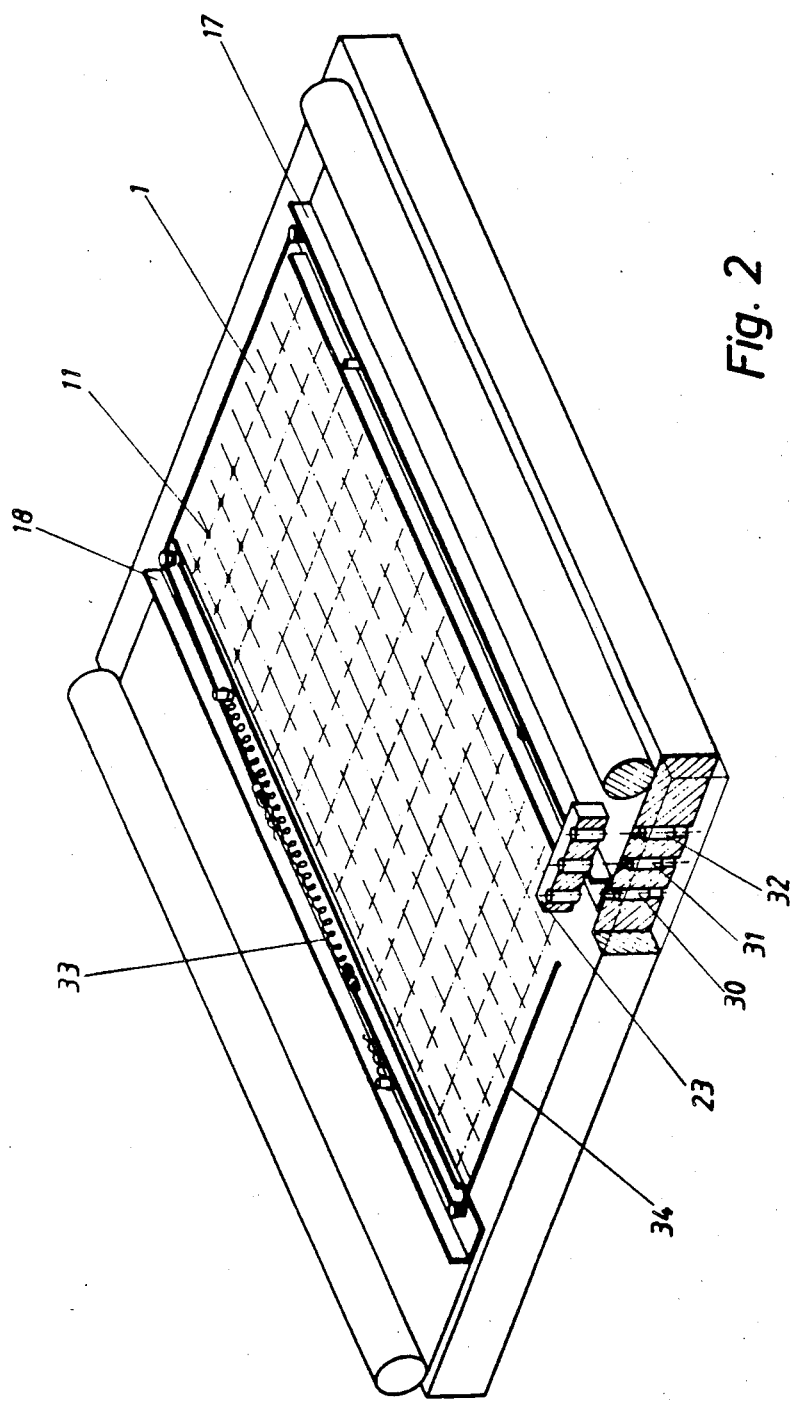
FIG. 2 shows a representation of the light barriers for detection of the film width.

FIG. 1 shows a loading device comprising a suction plate 1 (labelled in FIG. 2) provided with several rows of suction holes 11, and is illustrated in greater detail in FIG. 2. At one end of the suction plate 1 a film cassette 2 is arranged which is formed of a light-proof housing, illustrated in broken lines, and a roller 2 which takes up the film material 3. The roller 22 is driven by a motor 4, and the film material 3 proceeds in arrow direction 5 from the cassette and is slipped onto the suction plate 1. Additionally, two roller pairs 6 and 7 serve this purpose, and are arranged at the end face of the suction plate 1 within the cassetta 2. The roller pair 6 is likewise driven by a motor. The motors 4 and 8 can rotate in both directions, so that a forward as well as a reverse transport of the film material is possible. The roller pair 7 between the roller pair 6 and the end face of the plate 1 serves, within the cassette, as an additional light barrier for the cassette and as an additional guide for the film material 3. At the other end face of the suction plate 1, an additional roller pair 10 is provided which is driven by the motor 8 via a toothed belt 12. The gear or transmission ratio between the roller pair 10 and the roller pair 6 is selected such that the roller pair 10 rotates somewhat faster than the roller pair 6 in order that a tensile stress is exerted on the film material.

The contact pressure of the two rollers of the roller pair 10 is not as great as the contact pressure of the roller pair 6 in order that a friction can occur. One of the rollers of the roller pair 10 can e.g. be a felt roller or can be covered with a soft material in order that the film does not become scratched. Preferably a material is employed which prevents a static charge.

The suction plate itself exhibits a plurality of suction holes such as are described e.g. in the German OS No. 3,120,172 (DE No. 31 30 172AL), incorporated herein by reference. However, an ordered arrangement of the suction holes is also possible e.g. in rows or rectangles.

On the suction plate two rollers 13 and 14 are arranged at the lateral faces over the entire length of the plate. On the rollers a cloth 15 or 16, or a foil is wound. The foil or cloth has a width which corresponds to the length of the rollers, or of the suction plate itself. The length of the cloth or of the foil is selected so that in the unwound state, the suction plate is completely covered, so that this arrangement acts like two blinds. At the end of the foil two rails 17 and 18 are mounted which act as a limit stop in the drawn-out state of the blind. Their weight causes a weighting of the film material which leads to an improved placement of the material on the suction plate. One of the rollers 13 or 14, and in the example of FIG. 1 the roller 14, is driven by a motor 19. The second roller (in the example roller 13), is driven via a crossed and toothed belt 20. The two rails 17 and 18 are tensioned relative to one another by springs and can be drawn apart by the motor 19. In order to prevent the springs from again closing the blind, the motor 19 can operate via a self-locking gear, or it is provided with a brake. The method of operation of the loading device shall be described in greater detail in the following.

As already mentioned, the film material 3 is slipped onto the plate 1 by the roller pairs 6 and 7. During this operation the blind is closed, i.e. the rails 17 and 18 contact one another. Since the film material is unwound from a roller it has a curvature and normally, without the blind, would become upwardly arched and not rest against the suction plate. However, since the blind is closed, a slit results in which the material is inserted, and it is guaranteed that it will be smoothly slipped through beneath the rails and the cloth and seized by the roller pair 10 at the other end. After the film material has been seized by the roller pair 10, a punch is actuated, which is formed of the punch elements 21 which punch register holes in the film material. It is thus guaranteed that the material will remain exactly in this position and can again later be loaded in a register-precise fashion for further processing.

Behind the roller pairs 6 and 7, several light barriers 23 are arranged on the suction plate at the end face of the plate. With the aid of the light barriers, upon entry of the film material from the cassette, the respective width of the film material is detected. Independently of this value, after entry and punching of the film material, the motor 19 is actuated, and the blind is drawn apart to such an extent until the rails 17 and 18 just barely cover the edge of the film material. It is thus possible that the film material is pressed down at the edge by the rails and a curvature of the film material which has resulted from previous winding up on the roller 22 is eliminated. On the other hand, as compared with the suction plate without blinds, the suction holes which are disposed laterally of the film material and which normally would remain open, are covered so that the full suction power of the suction plate can develop. It has been shown that particularly in the case of large-format films, this type of loading is substantially more reliable, and that also the positioning accuracy is substantially greater compared with simple suction-contacting. This is true since the punch needles, after the punching of the register holes, remain in the punch position and thus, in conjunction with the blind, any slippage of the film material, even in the case of a reversing movement of the suction plate, is prevented.

In FIG. 2, the light barrier 23 is more closely illustrated in detail. Three component beams 30, 31, and 32 are present which, depending upon the width of the film material, are covered. In the suction plate 1, suction holes 11 are provided. In addition, in FIG. 2 a spring 33 is illustrated by which the rails 17 and 18 are tensioned or braced via a cable line 34.

Figure 3:
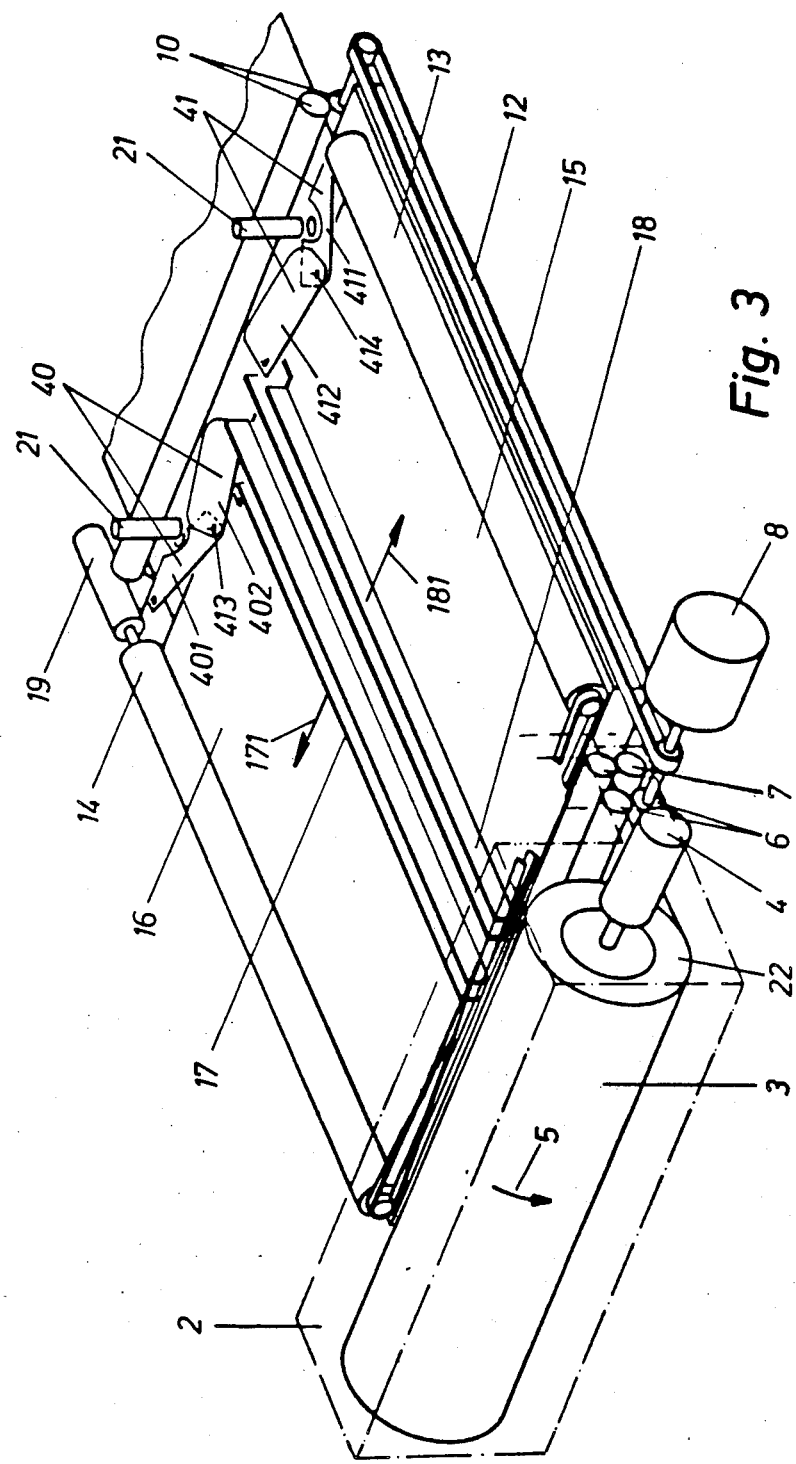
FIG. 3 shows a perspective view of an additional embodiment of the invention.

In FIG. 3, in addition to the embodiment according to FIG. 1, at the end of the rails 17 and 18 and at the corners of the suction plate 1, a scissors-like sheet metal construction 40 and 41 is provided lying flat on the cloth 15 and 16. This construction consists of two sheet metal parts 401, 402, and 411, 412, respectively. The sheet metal parts 401, 402 and 411, 412, respectively form a scissors-like articulation since they are hinged to one another at two ends in a common center of rotation 413 and 414, respectively. The free ends of the metal sheets 401, 402, and 411, 412, respectively are likewise rotatably mounted, specifically one metal sheet 401 and 411 each at the corners of the suction plate, and one metal sheet 402 and 412 each at the rail 17 and 18, respectively. If the rails 17 and 18 move in arrow direction 171 and 181, then the centers of rotation 413 and 414 become displaced on the cloth on which the metal sheets are disposed in the direction of the cassette 2. If the rails 17 and 18 are in the illustrated position, the two sheet metal constructions 40 and 41 press the cloths 15 and 16 before the roller pair 10 down on the suction plate so that the film material cannot raise the cloths. In addition, they form an extended guide for the film material in the direction of the rollers 10 so that the film material cannot deviate upwardly before the rollers 10.

Although various minor changes and modifications might be proposed by those skilled in the art, it will be understood that we wish to include within the claims of the patent warranted hereon all such changes and modifications as reasonably come within our contribution to the art.

We claim as our invention:

1. A device for loading and retaining film material on a suction plate, comprising:
   first and second pairs of cooperating transport rollers at respective first and second opposite ends of the suction plate;
   drive means for driving the first and second roller pairs;
   the first pair being positioned to receive a leading edge of the film material and being driven by the drive means so as to slide the film over the suction plate;
   the second pair being driven by the drive means and positioned to receive and engage the leading edge of the film material after it passes over the suction plates;
   the second roller pair being driven by the drive means more rapidly than the first roller pair such that the film is tensioned between the roller pairs;
   respective first and second shade rollers extending substantially along entire respective opposite lateral sides of the suction plate;
   each shade roller having a respective flexible sheet material wound thereon ;
   each shade roller being positioned and the flexible material wound thereon being dimensioned so that when both flexible materials are unwound a blind is formed which covers the suction plate so as to provide a partial vacuum where the blind covers usction holes not covered by the film;
   a leading end of each flexible material having a rail connected therewith such that in the unwound state of the material, the rails abut approximately at a center line of the suction plate so that during loading of the film, all suction holes and the film are covered so as to improve a partial vacuum over the suction plate;
   tension means connected to each rail for drawing the rails toward each other; and
   shade roller drive means connected to the shade rollers so as to counteract tension applied by the tension means by pulling across in a direction away from the center line.

2. A device according to claim 1 wherein for a given width of the film material, the blind rails are substantially at lateral edges of the film material and cover suction holes outwardly of lateral edges of the film material thereat so as to create a partial vacuum at such holes.

3. A device according to claim 1 wherein at the second end of the suction plate at which the second roller pair is positioned a punch means is provided which passes through the film during exposure so as to provide a register of the film relative to the suction plate.

4. A device according to claim 1 wherein the film material is provided in a cassette positioned at the first end of the suction plate and wherein the cassette includes within it the first roller pair.

5. A device according to claim 4 wherein also within the cassette and between the first roller pair and an outlet from the cassette an additional non-driven roller pair is provided.

6. A device according to claim 1 wherein the driven second roller pair which tensions the film material has a velvet brush material on at least one of the rollers of the pair.

7. A device according to claim 6 wherein the velvet brush material comprises an anti-static surface.

8. A device according to claim 1 wherein a non-driven roller pair is provided between the first roller pair and the suction plate, and wherein both the first roller pair and the adjacent non-driven roller pair are provided in a cassette before an outlet thereof.

9. A device according to claim 1 wherein first and second guide means each comprising first and second linked together metal parts connected in scissors-like fashion are provided and positioned to lie flat on the cloths at the second end of the suction plate, a first of the metal parts being hinged at its free end at one of the rails and the second part at its free end being hingedly connected at a respective corner of the suction plate.

10. A device according to claim 9 wherein each of the first and second metal parts have a recess means for avoiding collision with a punch means provided at the second end of the suction plate.

11. A method for loading and retaining film material on a suction plate, comprising the steps of:

providing first and second film transports respectively at an entrance and exit end of the suction plate;

providing first and second shade rollers with shades wound thereon at respective opposite lateral sides of the suction plate;

drawing the shades together so that they cover the suction plate and such that leading edges of the shades abut;

feeding at the entrance end a leading edge of the film material between the shades and the suction plate across a face of the suction plate to the exit end and engaging the leading end of the film material at the exit end in the second film transport;

tensioning the film by driving the second film transport at the exit end relative to the first film transoort at the entrance and so as to tension the film; and after the film is positioned, withdrawing the shades until said leading edges of the shades are approximately aligned with lateral edges of the film material so that suction holes laterally outward of the film material edges are covered.

12. A method for loading and retaining film material on a suction plate, comprising the steps of:

providing first and second film transport means respectively at an entrance and exit end of the suction plate;

providing first and second shade roller means with shades wound thereon at respective opposite lateral sides of the suction plate;

drawing the shades over the suction plate prior to loading the film material so that they cover at least a major portion of the suction plate;

feeding at the entrance end a leading edge of the film material between the shades and the suction plate across a face of the suction plate to the exit end and the second film transport means engaging the leading end of the film material at the exit end; and after loading the film, placing the shades such that leading edges of the shades are approximately aligned with lateral edges of the film material so that suction holes laterlly outward of the film material edges are covered.

* * * * *